United States Patent [19]
Ishimoto et al.

[11] Patent Number: 5,410,715
[45] Date of Patent: Apr. 25, 1995

[54] INTERRUPT CONTROLLER WITH SELECTABLE INTERRUPT NESTING FUNCTION

[75] Inventors: Satomi Ishimoto; Osamu Matsushima; Masaki Nasu; Masahiro Nomura, all of Tokyo, Japan

[73] Assignee: NEC Corporation, Tokyo, Japan

[21] Appl. No.: 8,387

[22] Filed: Jan. 25, 1993

Related U.S. Application Data

[63] Continuation of Ser. No. 658,739, Feb. 20, 1991, abandoned.

[30] Foreign Application Priority Data

Feb. 20, 1990 [JP] Japan .................................. 2-40144
Feb. 26, 1990 [JP] Japan .................................. 2-46085

[51] Int. Cl.$^6$ ............................................. G06F 13/26
[52] U.S. Cl. ............................... 395/775; 364/DIG. 1; 364/242.2; 364/241.2; 364/241.6
[58] Field of Search ................ 395/275, 325, 725, 775

[56] References Cited

U.S. PATENT DOCUMENTS

| | | |
|---|---|---|
| 4,398,244 | 8/1983 | Chu et al. |
| 4,488,227 | 12/1984 | Miu et al. ............................ 364/200 |
| 4,918,599 | 4/1990 | Hashimoto et al. ................. 395/725 |
| 5,050,067 | 9/1991 | McLagan et al. ................... 364/200 |

OTHER PUBLICATIONS

Mano, *Computer System Architecture*, 1982, pp. 434–435.

*Primary Examiner*—Thomas C. Lee
*Assistant Examiner*—Lance Leonard Barry
*Attorney, Agent, or Firm*—Whitham, Curtis, Whitham & McGinn

[57] ABSTRACT

An interrupt controller comprises a circuit for holding information obtained by designating one priority selected from a plurality of priorities for each of a plurality of interrupt requests, and a flag for indicating whether or not a nesting is allowed for an interrupt request having at least one predetermined priority of the plurality of priorities. On the basis of the priority information held in the circuit and information held in the flag, a controller operates so that when an interrupt request is generated in the course of execution of an interrupt processing having the predetermined priority, if the flag is in a first condition, the controller acknowledges the generated interrupt request only when the priority of the generated interrupt request is higher than the predetermined priority, and if the flag is in a second condition, the controller acknowledges the generated interrupt request not only when the priority of the generated interrupt request is higher than the predetermined priority, but also when the priority of the generated interrupt request is the same as the predetermined priority.

20 Claims, 7 Drawing Sheets

| 51-0 | 51-1 | 51-2 | 51-3 | 501 | 502 | 503 |
|------|------|------|------|-----|-----|-----|
| 0 | 0 | 0 | 0 | X | X | 1 |
| 1 | X | X | X | 0 | 0 | 0 |
| 0 | 1 | X | X | 0 | 1 | 0 |
| 0 | 0 | 1 | X | 1 | 0 | 0 |
| 0 | 0 | 0 | 1 | 1 | 1 | 0 |

X : NOT DEFINED

PROCESSING COMPLETION SIGNAL

|      |      |     |     | 206   |       |
|------|------|-----|-----|-------|-------|
| PR 1 | PR 0 | 501 | 502 | 901=0 | 901=1 |
| 0 | 0 | 0 | 0 | 1 | 0 |
| 0 | 0 | 0 | 1 | 1 | 1 |
| 0 | 0 | 1 | 0 | 1 | 1 |
| 0 | 0 | 1 | 1 | 1 | 1 |
| 0 | 1 | 0 | 0 | 0 | 0 |
| 0 | 1 | 0 | 1 | 1 | 0 |
| 0 | 1 | 1 | 0 | 1 | 1 |
| 0 | 1 | 1 | 1 | 1 | 1 |
| 1 | 0 | 0 | 0 | 0 | 0 |
| 1 | 0 | 0 | 1 | 0 | 0 |
| 1 | 0 | 1 | 0 | 1 | 0 |
| 1 | 0 | 1 | 1 | 1 | 1 |
| 1 | 1 | 0 | 0 | 0 | 0 |
| 1 | 1 | 0 | 1 | 0 | 0 |
| 1 | 1 | 1 | 0 | 0 | 0 |
| 1 | 1 | 1 | 1 | 1 | 0 |

INTERRUPT CONTROLLER WITH SELECTABLE INTERRUPT NESTING FUNCTION

CROSS-REFERENCE TO RELATED APPLICATION

This application is a continuation of application Ser. No. 07/658,739 filed Feb. 20, 1991, now abandoned.

BACKGROUND OF THE INVENTION

1. Field of the Invention

The present invention relates to an interrupt controller for use in a microcomputer, and more specifically to an interrupt controller having an interrupt priority control function.

2. Description of Related Art

In general, an interrupt controller has been located between a central processing unit (CPU) and a plurality of peripheral input/output (I/O) devices, and in ordinary cases, has the following functions:

(1) It is to acknowledge an interrupt request from each of the peripheral devices and to request an interrupt processing to the CPU;

(2) When a plurality of interrupt requests are concurrently generated from a plurality of peripheral devices, it is to select and acknowledge one interrupt request in accordance with the ranking of priority and to request a corresponding interrupt processing to the CPU; and (3) When the CPU is in the course of execution of an interrupt processing based on an interrupt request, if another interrupt request having a priority higher than that of the interrupt request corresponding to the interrupt processing under execution, it is to acknowledge the interrupt request having the high priority and to request a corresponding interrupt processing to the CPU. This function is called an "interrupt nesting function" based on the priority order control.

In the above mentioned interrupt function, an interrupt request which can be acknowledged in the course of execution of the interrupt processing of the CPU is limited to ones having a priority higher than that of the interrupt request corresponding to the interrupt processing under execution. Therefore, even if there is generated an interrupt request having the same priority as that of the interrupt request corresponding to the interrupt processing under execution, the late generated interrupt is not acknowledged, and therefore, is suspended in a not-yet-treated condition.

Recently, microcomputers have been used in various fields of application, and in some systems to be realized, it is desired to execute the interrupt nesting function for an interrupt request having the same priority as that of the interrupt request corresponding to the interrupt processing under execution. However, an interrupt controller having such a function has not yet been proposed. Therefore, this function has been realized in a software manner based on a program.

SUMMARY OF THE INVENTION

Accordingly, it is an object of the present invention to provide an interrupt controller which can execute the interrupt nesting function for a late generated interrupt request having the same priority as that of an interrupt request corresponding to an interrupt processing under execution.

Another object of the present invention is to provide an interrupt controller which can be used not only in systems which are required to have the interrupt nesting function for a late generated interrupt request having the same priority as that of an interrupt request corresponding to an interrupt processing under execution, but also in systems which are not required to have the same interrupt nesting function.

The above and other objects of the present invention are achieved in accordance with the present invention by an interrupt controller comprising means for holding priority information obtained by designating one priority selected from a plurality of priorities for each of a plurality of interrupt requests, a flag for indicating whether or not a nesting is allowed for an interrupt request having at least one predetermined priority of the plurality of priorities, and control means operating on the basis of the priority information held in the means and information held in the flag in such a manner that when an interrupt request is generated in the course of execution of an interrupt processing having the predetermined priority, if the information held in the flag is in a first condition, the control means acknowledges the generated interrupt request only when the priority of the generated interrupt request is higher than the predetermined priority, and if the information held in the flag is in a second condition, the control means acknowledges the generated interrupt request not only when the priority of the generated interrupt request is higher than the predetermined priority, but also when the priority of the generated interrupt request is the same as the predetermined priority.

With the above mentioned arrangement, it is possible to execute the nesting function for a plurality of interrupt requests having the predetermined priority. In addition, Whether or not this nesting function is realized is controlled by the information set in the flag.

In one preferred embodiment, the control means includes means for generating in-service priority information indicative of a priority designated for the interrupt processing under execution, means for changing a content of the in-service priority information so as to indicate a priority lower than the predetermined priority when the priority designated for the interrupt processing under execution is the predetermined priority and when the information held in the flag is in the second condition, and means for acknowledging the interrupt request generated in the course of execution of the interrupt processing when the interrupt request generated in the course of execution of the interrupt processing is higher than the priority indicated by the in-service priority information.

In another preferred embodiment, the control means includes means for generating in-service priority information indicative of a priority designated for the interrupt processing under execution, means for comparing the interrupt request generated in the course of execution of the interrupt processing, with the priority indicated by the in-service priority information, and means for acknowledging the generated interrupt request when a result of comparison outputted from the comparing means is at a first level and for not-acknowledging the generated interrupt request when the result of comparison outputted from the comparing means is at a second level. When the information held in the flag is in the first condition, the comparing means operates to bring the result of comparison into the first level only when the interrupt request generated in the course of execution of the interrupt processing is higher than the priority indicated by the in-service priority information. When the information held in the flag is in the second condition, the comparing means operates to bring the result of comparison into the first level not only when the interrupt request generated in the course of execution of the interrupt processing is higher than the priority indicated by the in-service priority information but also when the interrupt request generated in the course of execution of the interrupt processing is the same as the priority indicated by the in-service priority information.

The above and other objects, features and advantages of the present invention will be apparent from the following description of preferred embodiments of the invention with reference to the accompanying drawings.

DESCRIPTION OF THE PREFERRED EMBODIMENTS

Figure 1:
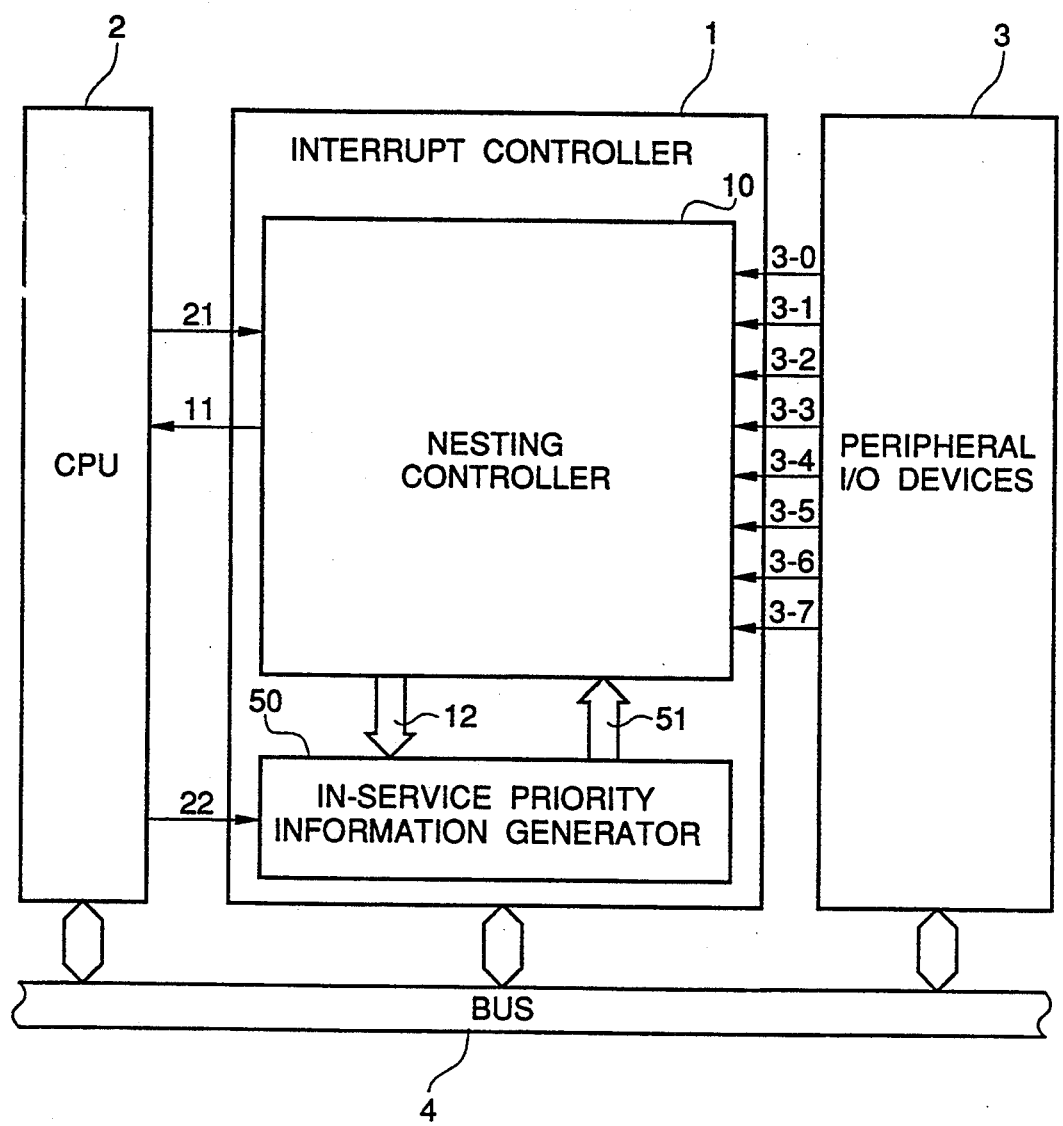
FIG. 1 is a block diagram of a microcomputer including a first embodiment of the interrupt controller in accordance with the present invention.

Now, embodiments of the interrupt controller in accordance with the present invention will be described with reference to the accompanying drawings. However, since the functions (1) and (2) explained hereinbefore, and well known various functions including an interrupt mask function and an interrupt vector information generation function do not have a direct relation to the present invention, a construction necessary for realizing these functions will be omitted, and only the interrupt nesting will be shown and explained. In the following description and in all figures, the same function parts are given the same Reference Numerals, and duplication of explanation will be avoided.

Referring to FIG. 1, there is shown a block diagram of a microcomputer including an interrupt controller 1 in accordance with a first embodiment of the present invention. The interrupt controller 1 is located between a central processing unit (CPU) 2 and a group of peripheral input/output (I/O) devices 3, and receives eight kinds of interrupt requests from the peripheral I/O devices 3 in the form of interrupt request signals 3-0 to 3-7. When an interrupt request is acknowledged, the interrupt controller 1 generates an interrupt processing request signal 11 to the CPU 2. On the other hand, the CPU 2 outputs to the interrupt controller 1 an interrupt processing acknowledge signal 21 indicating that an interrupt processing request is acknowledged, and an interrupt processing completion signal 22 indicating that the acknowledged interrupt processing has been completed. The interrupt controller 1, the CPU 2 and the peripheral I/O devices 3 are mutually coupled by means of an address/data bus 4, so that a required read/write of data is performed through the bus 4.

The interrupt controller 1 includes a nesting controller 10 and an in-service priority information generator 50. The interrupt request signals 3-0 to 3-7 are supplied to the nesting controller 10, and the nesting controller 10 generates the interrupt processing requesting signal 11. The interrupt processing acknowledge signal 21 and the interrupt processing completion signal 22 generated by the CPU 2 are supplied to the nesting controller 10 and the in-service priority information generator 50, respectively. The nesting controller 10 outputs acknowledged interrupt priority information 12 indicating a priority designated for the acknowledged interrupt request, to the in-service priority information generator 50, and on the other hand, the in-service priority information generator 50 supplies to the nesting controller 10, in-service priority information 51 indicating a priority of an interrupt processing being executed by the CPU 2.

Figure 2:
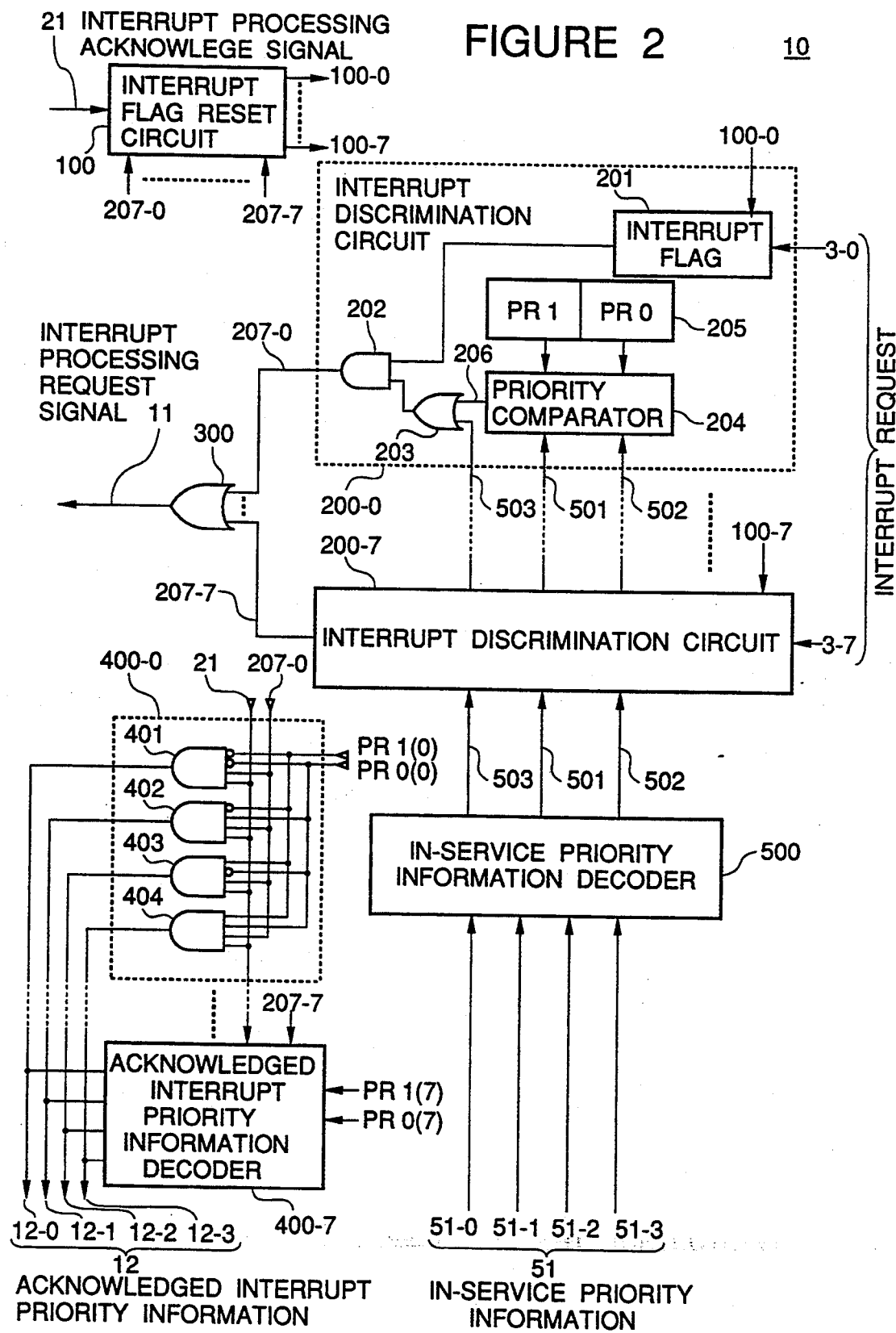
FIG. 2 is a block diagram of an internal structure of the nesting controller included in the microcomputer shown in FIG. 1.

Referring to FIG. 2, the nesting controller 10 includes interrupt discrimination circuits 200 (200-0 to 200-7) provided in correspondence to the interrupt request signals 3-0 to 3-7, respectively. Since these interrupt discrimination circuits 200-0 to 200-7 have the same construction, an internal structure of only the interrupt discrimination circuit 200-0 is shown in FIG. 2. The interrupt discrimination circuit 200 has an interrupt flag 201, an AND gate 202, an OR gate 203, a priority comparator 204 and a priority designation register 205, which are connected as shown in FIG. 2. When a corresponding interrupt request signal 3 is generated, the interrupt flag 201 is brought into a set condition and supplies a logic "1" to the associated AND gate 202. The priority designation register 205 has two bits PR1 and PR0 (PR1 is a higher place) for holding a priority ranking or level designated for the corresponding interrupt request.

In this embodiment, four levels of priority can be set in such a manner that the priority lowers in the named order of (0,0), (0,1), (1,0) and (1,1) of the two bits PR1 and PR0 of the priority designation register 205. Namely, when the two bits PR1 and PR0 of the priority designation register 205 are (0,0), it shows the highest priority, and when the two bits PR1 and PR0 of the priority designation register 205 are (1,1), it shows the lowest priority. As a result, at least one priority level is designated to a plurality of interrupt requests. For each of the interrupt requests 3-0 to 3-7, one of the four priority levels is designated by the CPU 2, namely, can be freely set by use of a program.

The priority comparator 204 receives and compares the priority given by the two bits PR1 and PR0 of the priority designation register 205 and an in-service priority 501 and 502 (501 is a high place and 502 is a low place) supplied from an in-service information decoder 500 which will be explained hereinafter. When the priority given by the priority designation register 205 is higher than the in-service priority 501 and 502 supplied from the in-service information decoder 500, the priority comparator 204 generates an output 206 of a logic "1", which is supplied through the OR gate 203 to the AND gate 202. The OR gate 202 also receives an output 503 from the in-service information decoder 500.

Thus, when a corresponding interrupt request 3 is generated, each interrupt discrimination circuit 200 judges, on the basis of the content of the priority designation register 205 and the in-service priority information supplied from the in-service information decoder 500, whether or not the generated corresponding interrupt request 3 should be acknowledged. When the interrupt request 3 is acknowledged, the interrupt discrimination circuit 200 generates a corresponding discrimination output 207 of a logic "1".

Discrimination outputs 207-0 to 207-7 of the eight interrupt discrimination circuits 200-0 to 200-7 are supplied to an OR gate 300, which outputs the interrupt processing request signal 11. Thus, when the interrupt request is generated, the interrupt processing request to the CPU 2 is generated. If the CPU 2 acknowledges the interrupt processing request, the CPU sends the interrupt processing acknowledge signal 21 to the nesting controller 10.

In response to this interrupt processing acknowledge signal 21 and the discrimination outputs 207-0 to 207-7 of the eight interrupt discrimination circuits 200-0 to 200-7, an interrupt flag reset circuit 100 activates one of flag reset signals 100-0 to 100-7 which corresponds to the acknowledged interrupt request, so that a corresponding interrupt flag 201 is reset.

When the interrupt request is acknowledged, it is necessary to detect the priority level of the acknowledged interrupt request, and to notify the detected priority level to the in-service information generator 50. For this purpose, eight acknowledged interrupt priority information decoders 400-0 to 400-7 are provided in correspondence to the eight interrupt discrimination circuits 200-0 to 200-7, respectively. These decoders have the same construction, an internal structure of only the acknowledged interrupt priority information decoder 400-0 is shown.

The acknowledged interrupt priority information decoder 400 includes four AND gates 401 to 404 having inputs connected as shown to receive four input signals. A first input signal to the decoder 400 is the interrupt processing acknowledge signal 21 from the CPU 2, and a second input signal is the discrimination output 207 of the corresponding interrupt discrimination circuit 200. Third and fourth input signals are the two bits PR1 and PR0 of the priority designation register 205 in the corresponding interrupt discrimination circuit 200. Therefore, for example, assuming that the interrupt request 3-0 is acknowledged, and the acknowledged interrupt request 3-0 has the priority level of (0,0), the AND gate 401 generates a signal of the logic "1" in response to the interrupt processing acknowledge signal 21. If the priority order is (0,1), (1,0) or (1,1), the AND gate 402, 403 or 404 outputs the signal of the logic "1", respectively. The outputs of the four AND gates 401 to 404 are supplied as bit signals 12-0 to 12-3 which constitute the acknowledged interrupt priority information 12. Namely, since the four levels of priority can be set as mentioned hereinbefore, the acknowledged interrupt priority information 12 is constituted of four bits, so that one bit of the acknowledged interrupt priority information 12 corresponding to the priority level of the acknowledged interrupt request is activated.

On the basis of the acknowledged interrupt priority information 12, the in-service priority information generator 50 generates the in-service priority information 51 in relation to the priority of the interrupt processing being executed by the CPU 2. This in-service priority information 51 is also constituted of four bit signals 51-1 to 51-3. Basically, when the priority of the interrupt processing being executed by the CPU 2 is (0, 0), (0, 1), (1, 0) or (1, 1), respectively, the bit signals 51-0, 51-1, 51-2 or 51-3 is brought to the logic "1", respectively.

Figures 3, 4:
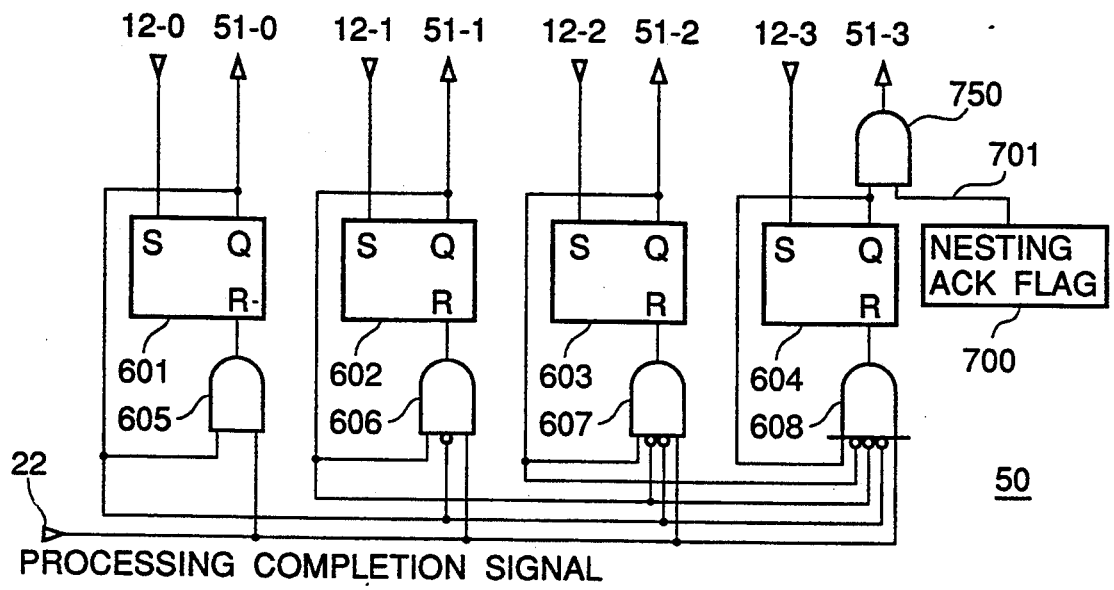
FIG. 3 is a block diagram of an internal structure of the in-service priority information generator included in the microcomputer shown in FIG. 1.
FIG. 4 shows a relation between input data and output data in the in-service priority information decoder shown in FIG. 2.

On the basis of the in-service priority information 51, the in-service priority information decoder 500 controls the logic level of bit output signals 501, 502 and 503 as shown in FIG. 4. Namely, when all the bit signals 51-1 to 51-3 of the in-service priority information 51 are "0", the decoder 500 brings the bit signal 503 into "1", so that the interrupt discrimination circuit 200 operates to acknowledge the generated interrupt request 3 regardless of the output 206 of the comparator 204. In the other situations, namely, when the bit signals 51-1 to 51-3 of the in-service priority information 51 are not all "0", the decoder 500 generates the output bits 501 and 502 showing the in-service priority, on the basis of the position of the bit "1" in a pattern of the bit signals 51-1 to 51-3, as shown in FIG. 4.

Referring to FIG. 3, the in-service priority information generator 50 includes four set-reset (S-R) flipflops 601 to 604 having a set terminal S connected to receive the bit signals 12-0 to 12-3 of the acknowledged priority information 12, respectively. In addition, there is provided a flag 700 indicating whether or not the nesting for the interrupt request of the same priority level is permitted. This flag can be written and rewritten to the logic "0" or the logic "1" by means of a programmed processing of the CPU 2. In this embodiment, when the flag 700 is of the logic "1", the nesting for the same priority level is inhibited, and when the flag 700 is of the logic "0", the nesting for the same priority level is permitted. In addition, the priority level allowing the nesting of the same level is only the level of (1, 1), namely, the lowest priority level.

For this purpose, Q outputs of the flipflops 601 to 603 are supplied, without modification, as the bit signals 51-0 to 51-2 of the in-service priority information 51. On the other hand, the Q output of the flipflop 604 and an output 701 of the flag 700 are inputted to an AND gate 750, so that a logical product of the Q output of the flipflop 604 and an output 701 of the flag 700 is supplied as the bit signal 51-3 of the in-service priority information 51.

With this arrangement, even if the interrupt request of the priority level (1, 1) is acknowledged and the flipflop 604 is set by the signal 12-3 which is generated in response to the interrupt processing acknowledge signal 21 generated by the CPU 2 having started an interrupt processing corresponding to the acknowledged interrupt request, if the flag 700 is of "0", the Q output of the flipflop 604 is masked, so that the bit signal 51-3 is maintained at "0". On the other hand, if the flag 700 is of "1", when the flipflop 604 is set, the bit signal 51-3 is brought to "1".

The flipflops 601 to 604 are respectively reset by an output of AND gates 605 to 608, which have inputs receiving input signals as shown in the drawings. Therefore, if a plurality of flipflops are in the set condition, the flipflop positioned at the highest place is first reset by the interrupt processing completion signal 22. With this arrangement, even if the interrupt nesting is performed, the acknowledged information of the lower lever interrupt request will never be lost.

Now, operation of the circuits will be explained under the assumption that the interrupt requests 3-0 to 3-7 are designated to priorities of (0, 0), (0, 1), (0, 1), (1, 0), (1, 0), (1, 1), (1, 1) and (1, 1), respectively.

Now, assume that the interrupt request 3-5 was generated and acknowledged. The acknowledged interrupt priority information 12 is brought to "0001", so that the flipflop 604 is set. On the other hand, the CPU 2 starts the interrupt processing corresponding to the interrupt request 3-5.

If the flag 700 is set to "1", the in-service priority information 51 is brought to "0001". In response to this in-service priority information 51, the decoder 500 brings the output signal 503 into the logic "0" and the in-service priority signals 501 and 502 into a condition of (1, 1). Under this condition, even if the interrupt request 3-7 is generated, since the interrupt request 3-7 has the designated priority level of (1, 1), the priority comparator 204 of the corresponding interrupt discrimination circuit 200-7 maintains its output 206 at the logic "0". Therefore, the interrupt request 3-7 is not acknowledged, and accordingly, is reserved in a not-yet-executed condition.

On the other hand, if an interrupt having the designated priority level higher than the priority level of (1, 1), for example, the interrupt request 3-1 is generated, the priority comparator 204 of the corresponding interrupt discrimination circuit 200-1 brings its output 206 into the logic "1". Therefore, the interrupt request 3-1 is acknowledged and the interrupt processing request signal 11 is generated to the CPU 2. In response to the interrupt processing request signal 11, the CPU 2 interrupts the processing for the interrupt request 3-5, and saves data required at the time of return, into a stack region (not shown) of a memory (not shown). Thereafter, the CPU 2 starts the processing for the interrupt request 3-1. As a result, the acknowledged interrupt designation information 12 is brought to "0100", and the in-service priority information 51 is brought to "0101". Thus, the decoder 500 modifies the in-service priority 501 and 502 into a condition of (0, 1). As a result, in the course of execution of the processing for the interrupt request 3-1, if the interrupt request 3-0 is generated, it will be acknowledged, but even if the other interrupt requests are generated, they will never be acknowledged.

If the processing for the interrupt request 3-1 has been completed, the CPU 2 immediately generates the processing completion signal 22, and returns the saved data so as to restart the processing for the interrupt request 3-5. In response to the processing completion signal 22, the flipflop 602 is reset, but the flipflop 604 is not reset. As a result, the in-service priority is returned to (1, 1).

As mentioned above, if the flag 700 is set to "1", the nesting for interrupt requests 3-5 to 3-7 designated to the priority of (1, 1) is inhibited, but the nesting for an interrupt request having a higher priority is allowed.

On the other hand, when the interrupt request 3-5 is acknowledged, if the flag 700 is in the "0" condition, the Q output of the flipflop 604 is masked by the AND gate 750, so that the in-service priority information 51 is brought into "0000". Accordingly, if the interrupt request 3-6 or 3-7 designated to the same priority as that of the interrupt request 3-5 is generated, the late generated interrupt request having the same priority level will be acknowledged. The CPU 2 interrupts the processing for the interrupt request 3-5 and executes a processing for the late generated interrupt request 3-6 or 3-7. When this processing has been completed and the completion signal 22 is generated, the flipflop 604 is reset. However, since the Q output of the flipflop 604 is masked by the AND gate 750, the reset of the flipflop 605 will have no influence.

As will be apparent from the above description, if the flag 700 is set to "0", the nesting between the interrupt requests having the lowest priority level is enabled. But, if the flag 700 is set to "1", the interrupt nesting is executed in accordance with the ordinary priority ranking.

Figures 5, 9:
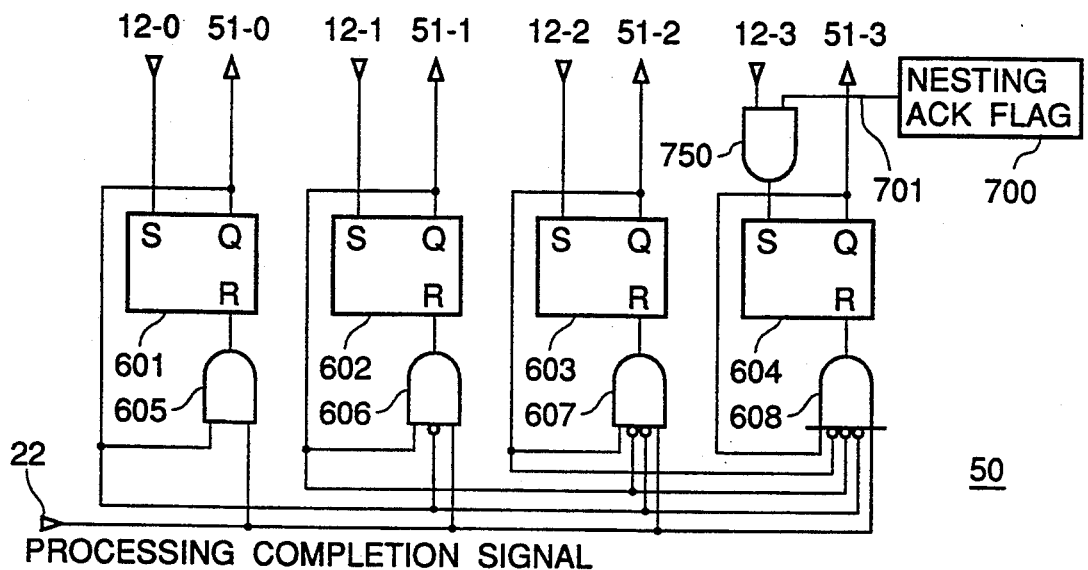
FIG. 5 is a block diagram of an internal structure of another example of the in-service priority information generator.
FIG. 9 shows a relation between input data and output data in the priority comparator shown in FIG. 7.

Turning to FIG. 5, there is shown another example of the in-service priority information generator 50. In this example, the AND gate 750 is provided for the bit signal 12-3 of the acknowledged priority information 12. Namely, the AND gate 750 operates to mask the Q output of the flipflop 604 in the example shown in FIG. 3, but to mask a set signal that should be applied to the flipflop 604 in the example shown in FIG. 5. Therefore, the example shown in FIG. 5 operates substantially similarly to the example shown in FIG. 3, and can exert a function substantially similar to the example shown in FIG. 3.

The priority level in which the interrupt nesting at the same priority level is enabled is limited to the lowest priority level (1, 1) in the above mentioned embodiment, but an arbitrary priority level can be selected for the nesting between interrupt requests of the same priority level, by designing the construction of the in-service priority information generator 50 so as to comply with the requirement.

Figure 6:
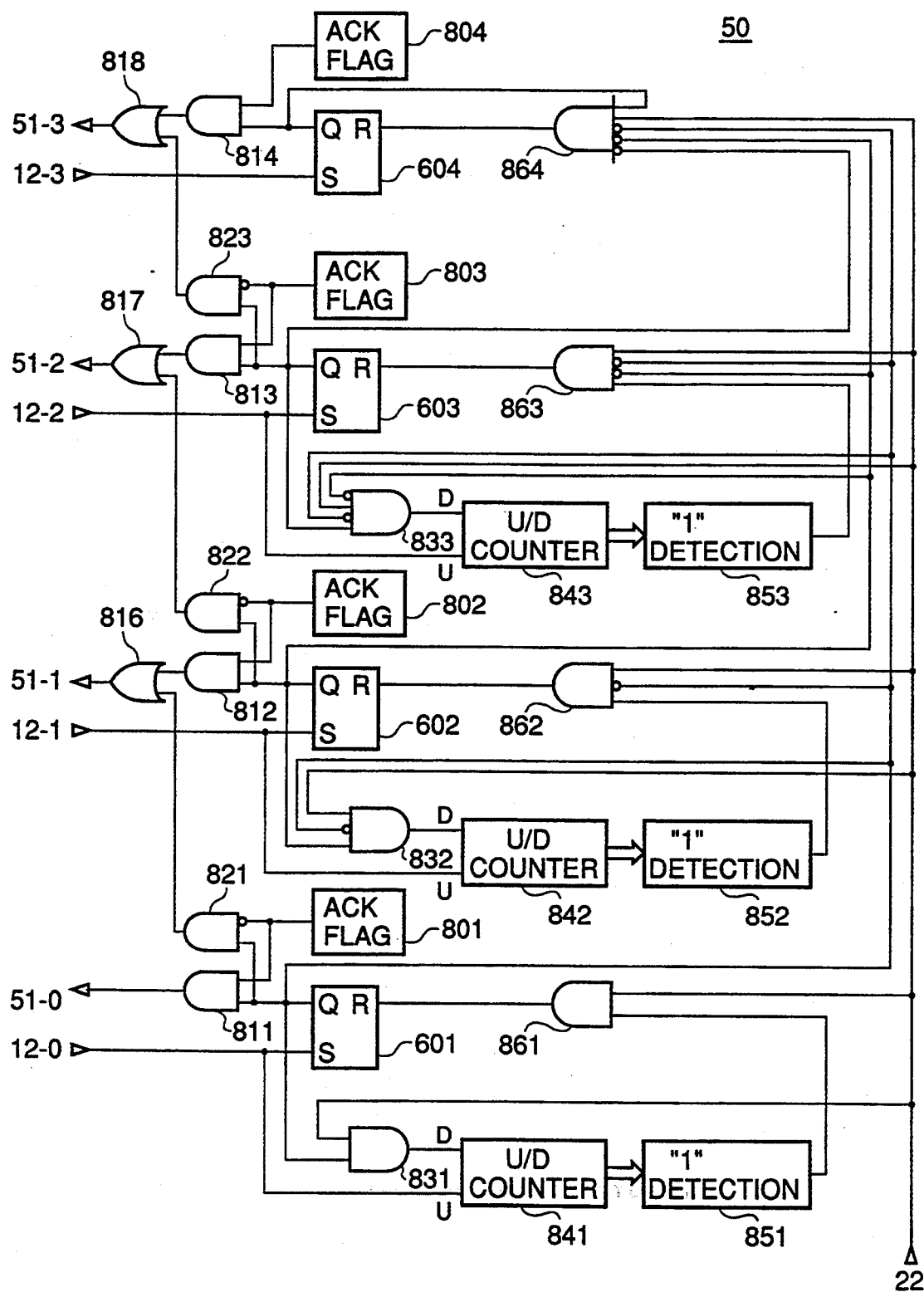
FIG. 6 is a block diagram of an internal structure of still another example of the in-service priority information generator.

Referring to FIG. 6, there is shown one example of the in-service priority information generator 50 capable of complying with the requirement.

Four nesting permission flags 801 to 804 are provided in correspondence to the four priority levels, respectively. The Q outputs of the flipflops 601 to 604 are masked or not masked by AND gates 811 to 814 respectively on the basis of information held in the flags 801 to 804. Outputs of the AND gates 812, 813 and 814 are connected to OR gates 816, 817 and 818, respectively. These OR gates 816, 817 and 818 are connected to also receive an output of AND gates 812, 813 and 814, respectively, each of which receives an inverted information of a just higher place flag and the Q output of a just higher place flipflop.

For example, in order to permit the nesting between interrupt requests of the priority level (0, 0) and the nesting between interrupt requests of the priority level (1, 0), the flags 801,802, 803 and 804 are set to "0", "1", "0" and "1", respectively. Now, assuming that an interrupt request of the priority level (0, 0) is acknowledged, the flipflop 601 is set, but the Q output of the flipflop 601 is masked by the AND gate 811. On the other hand, the AND gate 821 outputs the logic "1", which is supplied through the OR gate 816 as the bit signal 51-1 of "1" in the in-service priority information 51. Namely, the CPU 2 executes a processing for the interrupt request of the highest priority level (0, 0), but the in-service priority level of (0, 1) is supplied to the respective interrupt discrimination circuits 200. Accordingly, if another interrupt request designated to the highest priority is generated, it is acknowledged. Of course, when an interrupt processing for an interrupt request of the priority level (1, 0) is under execution, if an interrupt request designated to the highest priority is generated, it is acknowledged.

In the above mentioned embodiment, in the course of execution of the interrupt processing for the interrupt request, if another interrupt request designated to the same priority level is generated, it is acknowledged and a corresponding processing is executed. In this situation, even if the interrupt processing for the late interrupt request of the same priority level is completed, the flipflop 601 should not be reset, because the interrupted processing for the early interrupt request of the priority level (0, 0) has not yet been completed. For this purpose, an AND gate 831, an up/down counter 841 and a count "1" detector 851 are provided for the highest priority level, and an output of the detector 851 is supplied to an AND gate 861 for resetting. A second input of the AND gate 861 is connected to receive the acknowledged interrupt priority information 12, and an output of the AND gate 861 is connected to a reset terminal R of the flipflop 601.

The up/down counter 841 has an UP terminal U connected to receive the bit signal 12-0 of the acknowledged interrupt priority information 12 and a DOWN terminal D connected to an output of the AND gate 831, which in turn receives the Q output of the flipflop 601 and the interrupt processing completion signal 22. The detector 851 operates to detect whether or not the count value of the counter 841 is "1", and to generate an output of the logic "1" when the count value "1" of the counter 841 is detected.

Therefore, in the above mentioned description, when the interrupt processing for the late generated interrupt request of the same priority level is completed and the interrupt processing completion signal 22 is generated, the count value of the counter 841 is "2", and therefore, the output of the detector 851 is "0". Namely, the flipflop 601 is not reset. After the interrupted processing is restarted, when the restarted processing is completed, the count value of the counter 841 is brought to "1". At this time, the flipflop 601 is reset. For similar purposes, AND gates 832 and 833, up/down counters 842 and 843 and count "1" detectors 852 and 853 are provided for the flipflops 602 and 603, respectively.

Figure 7:
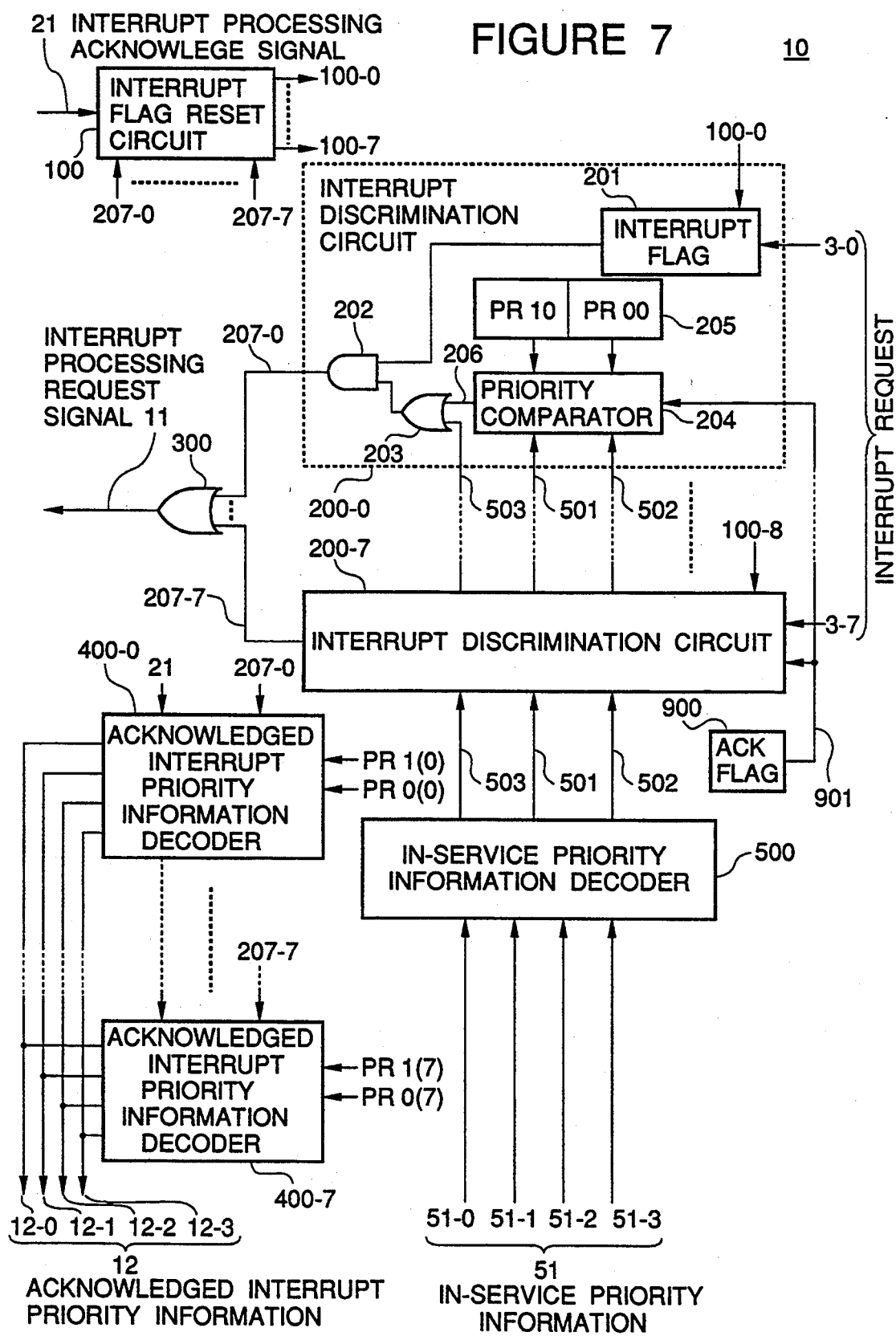
FIG. 7 is a block diagram of an internal structure of a nesting controller included in a second embodiment of the interrupt controller in accordance with the present invention.

The above mentioned embodiments are configured to control permission and inhibition of the nesting for a second interrupt request of the same priority level in the course of execution of the interrupt processing of the selected priority level. However, it is possible to control the nesting for a second interrupt request of the same priority level in the course of execution of the interrupt processing of any arbitrary priority level, regardless of the priority level of the interrupt processing being executed. Another embodiment for this purpose is shown in FIG. 7.

In this embodiment, a nesting permission flag 900 is provided in the nesting controller 10, and an output 901 of the flag 900 is connected in common to the priority comparator 204 of the interrupt discrimination circuits 200-0 to 200-7. Namely, each priority comparator 204 responds not only to the designated priority (PR1, PR0) of the priority designation register 205 and the in-service priority level (501, 502) but also to the output 901 of the nesting permission flag 900, so that it generates the result of comparison as shown in FIG. 9.

If the nesting permission flag 900 is set to "1" so as to output the flag information 901 of "1", each priority comparator 204 generates the output 206 of the logic "1" only when the designated priority (PR1, PR0) of the priority designation register 205 is higher than the in-service priority level (501, 502), similarly to the above mentioned embodiment. On the other hand, if the nesting permission flag 900 is set to "0", each priority comparator 204 generates the output 206 of the logic "1" not only when the designated priority (PR1, PR0) of the priority designation register 205 is higher than the in-service priority level (501,502), but also when the designated priority (PR1, PR0) of the priority designation register 205 is equal to the in-service priority level (501, 502).

Thus, whatever priority level the processing under execution has, if there is generated a second interrupt request of the same priority level as that of the interrupt processing being executed, the second interrupt request is acknowledged when the nesting permission flag 900 is "0", and a processing for the second interrupt request is executed. Of course, if there is generated a second interrupt request of the priority level which is higher than that of the interrupt processing being executed, the second interrupt request is acknowledged, but the interrupt request having a lower priority level is reserved. When the nesting permission flag 900 is "1", only an interrupt request of the priority level which is higher than that of the interrupt processing being executed is acknowledged.

Figure 8:
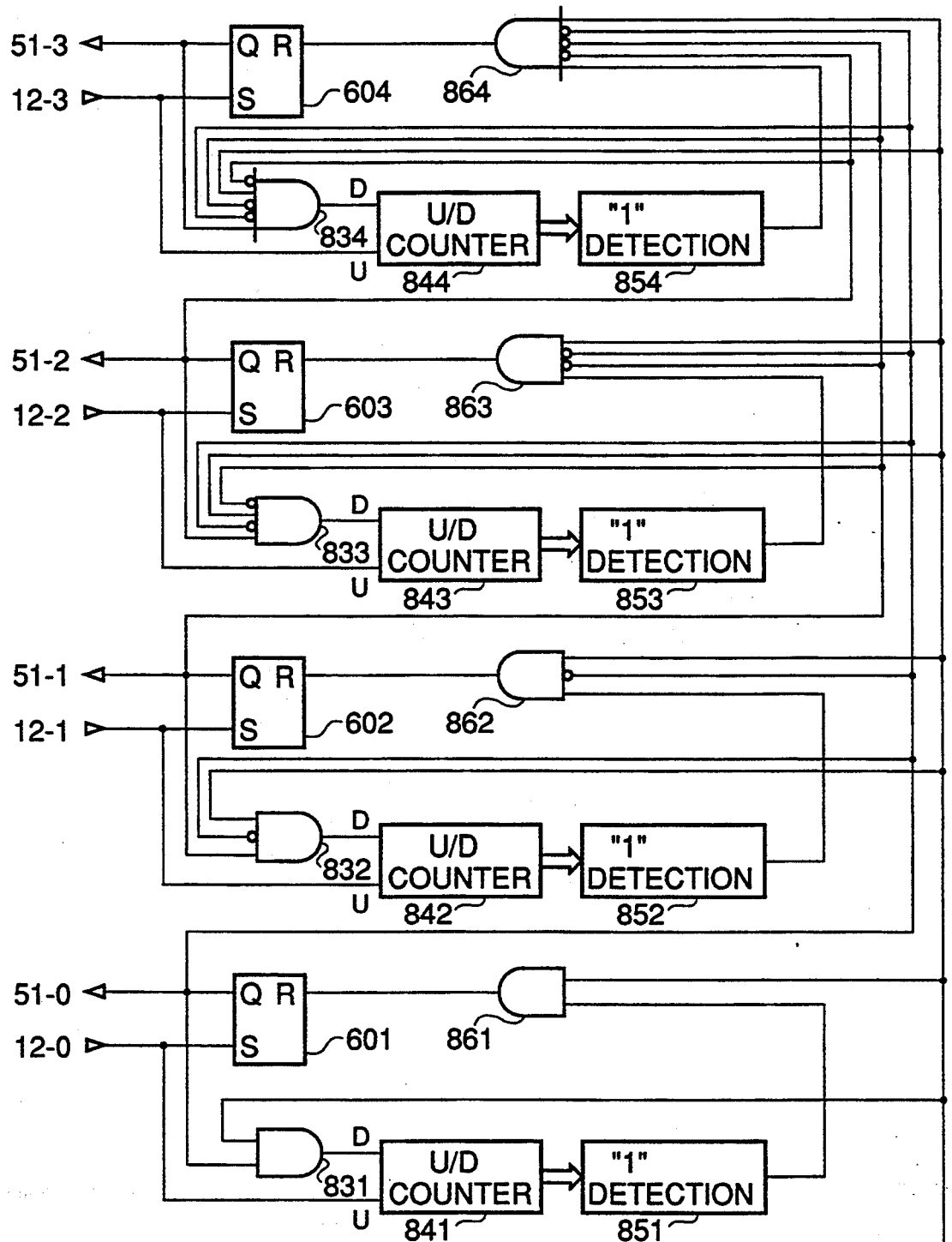
FIG. 8 is a block diagram of an internal structure of an the in-service priority information generator included in the second embodiment of the interrupt controller in accordance with the present invention.

In this embodiment, the in-service priority information generator 50 can be constructed as shown in FIG. 8. As seen from comparison between FIGS. 6 and 8, the in-service priority information generator 50 shown in FIG. 8 does not include the nesting permission flag and the associated gates, but additionally includes a flipflop reset control circuit which is provided for the flipflop 604 and which comprises an AND gate 834, an up/down counter 844 and a count "1" detector 854.

In the in-service priority information generator 50 shown in FIG. 8, it is possible to provide the permission flag 900 for each of the interrupt discrimination circuits 200, similarly to the example shown in FIG. 6. In this modified example, it is possible to select the nesting control for same priority interrupt requests for each of the interrupts 3-0 to 3-7.

As seen from the above, the interrupt controller in accordance with the present invention can execute the interrupt nesting not only for an interrupt request of a higher priority level but also for an interrupt request of the same priority level. Therefore, the interrupt controller in accordance with the present invention can elevate performance and function of constructed systems.

The invention has thus been shown and described with reference to the specific embodiments. However, it should be noted that the present invention is in no way limited to the details of the illustrated structures but changes and modifications may be made within the scope of the appended claims. For example, instead of using the up/down counters in the in-service priority information generators shown in FIGS. 6 and 8, it is possible to mask the processing completion signal 22 when the processing of the interrupt caused by the same priority level nesting is completed. In addition, it is possible to change or modify the number of the interrupt requests and the number of the priority levels.

We claim:

1. An interrupt controller providing an interface between a central processing unit and a group of peripheral input/output devices having a plurality of interrupt priority levels, said interrupt controller allowing nesting of interrupts having like priority levels and comprising:

generator means for generating an in-service priority level signal corresponding to an acknowledged interrupt priority level currently being executed by said central processing unit; and comparing means for comparing a newly requested interrupt priority level to said in-service priority level signal, and permitting nesting if said newly requested interrupt priority level signal is higher than said in-service priority level signal, said generator means comprising:

register means, corresponding to each of said priority levels, for receiving and holding said acknowledged interrupt priority level;

a flag associated with said register means, said flag indicating whether or not a nesting is allowed for said corresponding priority level; and logic means, connected to said register means and to said flag, for outputting said in-service priority level signal corresponding to said acknowledged interrupt priority level if said flag is in a first state or for outputting said in-service priority level signal corresponding to a lower priority level than said acknowledged interrupt priority level if said flag is in a second state.

2. An interrupt controller as recited in claim 1 wherein said generator means further includes resetting means for resetting said register means in response to an interrupt processing completion signal generated by said central processing unit.

3. An interrupt controller as recited in claim 2 wherein said resetting means includes counter means connected to said register means for counting the number of nested interrupts.

4. An interrupt controller providing an interface between a central processing unit and a group of prioritized peripheral input/output devices having a plurality of interrupt priority levels, said interrupt controller selectively allowing nesting of newly generated interrupt requests having like priority levels and comprising:

generator means for generating an in-service priority level signal corresponding to an acknowledged interrupt priority level in the course of execution by said central processing unit;

a flag for indicating whether or not nesting of interrupts having like priorities is allowed for said newly generated interrupt request;

comparing means for comparing priority levels of said newly generated interrupt request signal and said in-service priority level signal and permitting a nesting of interrupts having like priorities if said flag is in a first condition and not permitting nesting if said flag is in a second condition.

5. An interrupt controller as recited in claim 4 wherein said generator comprises:

register means, corresponding to each of said one of said priority levels, for receiving and holding said acknowledged interrupt priority level;

counter means, connected to said register means, for counting the number of nested interrupts for allowing said register to be reset after all of said nested interrupts are executed.

6. An interrupt controller providing an interface between a central processing unit and a group of peripheral input/output devices, said interrupt controller, said central processing unit and said group of peripheral input/output devices being mutually coupled by an address/data bus, said interrupt controller comprising a nesting controller and an in-service priority information generator, said nesting controller responding to interrupt request signals and supplying an interrupt processing request signal to said central processing unit, and said central processing unit supplying an interrupt processing acknowledge signal to said nesting controller and completion signal to said in-service priority information generator, said nesting controller providing acknowledged interrupt priority information indicating a priority designated for the acknowledged interrupt request to the in-service priority information generator, and said in-service priority generator supplying to the nesting controller in-service priority information indicating a priority of an interrupt processing being executed by the central processing unit, said nesting controller comprising a plurality of interrupt discrimination circuits, one for each of the interrupt request signals, each of said interrupt discrimination circuits including register means for holding priority information for a corresponding one of said peripheral input/output devices, said priority information being input to said register means by said central processing unit and selected from a plurality of priorities ordered from a higher priority to a lower priority, each of said interrupt discrimination circuits judging whether or not a corresponding interrupt request signal should be acknowledged, a nesting flag for indicating whether or not a nesting is allowed for an interrupt request having a predetermined priority among said plurality of priorities, and said nesting controller further comprising control means connected to said register means and said flag and operating in such a manner that when an interrupt request is generated by one of said peripheral input/output devices in the course of execution of an interrupt processing having said predetermined priority, if the information held in said flag is in a first state, said control means acknowledges the generated interrupt request only when the priority of the generated interrupt request is higher than said predetermined priority, and if the information held in said flag is in a second state, said control means acknowledges the generated interrupt request not only when the priority of the generated interrupt request is higher than said predetermined priority, but also when the priority of the generated interrupt request is the same as said predetermined priority.

7. An interrupt controller claimed in claim 6 wherein said control means includes:

logic means connected to said register means and responsive to the course of execution of an interrupt processing for generating in-service priority information indicative of a priority designated for the interrupt processing under execution, nesting control means connected to said flag for changing a content of said in-service priority information so as to indicate a priority lower than said predetermined priority when the priority designated for the interrupt processing under execution is said predetermined priority and when the information held in said flag is in said second state, and means for acknowledging said interrupt request generated in the course of execution of the interrupt processing when said interrupt request generated in the course of execution of the interrupt processing is higher than the priority indicated by said in-service priority information.

8. An interrupt controller claimed in claim 6 wherein said control means includes:

logic means connected to said register means and responsive to the course of execution of an interrupt processing for generating in-service priority information indicative of a priority designated for the interrupt processing under execution, comparing means connected to said logic means for comparing said interrupt request generated in the course of execution of the interrupt processing, with the priority indicated by said in-service priority information, and means responsive to said comparing means for acknowledging said generated interrupt request when a result of comparison outputted from said comparing means is at a first level and for not-acknowledging said generated interrupt request when the result of comparison outputted from said comparing means is at a second level, said comparing means operating in such a manner that, when the information held in said flag is in said first state, said comparing means operates to bring the result of comparison into said first level only when said interrupt request generated in the course of execution of the interrupt processing is higher than the priority indicated by said in-service priority information, and when the information held in said flag is in said second condition, said comparing means operates to bring the result of comparison into said first level not only when said interrupt request generated in the course of execution of the interrupt processing is higher than the priority indicated by said in-service priority information but also when said interrupt request generated in the course of execution of the interrupt processing is the same as the priority indicated by said in-service priority information.

9. An interrupt controller claimed in claim 6, wherein each interrupt discrimination circuit has an interrupt flag, an AND gate and a comparator, said interrupt flag being set by a corresponding interrupt request signal and enabling said AND gate, said comparator receiving and comparing an output of said priority designation register means with in-service priority signals supplied from an in-service decoder in response to said in-service priority information supplied by said in-service priority information generator, said comparator providing a logic "1" to said AND gate when priority information held by said register means is greater than said in-service priority signals thereby judging whether or not the interrupt request signal should be acknowledged, outputs of all of said interrupt discrimination circuits being supplied to an OR gate which generates said interrupt processing request signal to the central processing unit.

10. The interrupt controller claimed in claim 9, wherein each interrupt discrimination circuit further includes a second OR gate connected to supply the output of said priority comparator to said AND gate, said decoder, in response to in-service priority information from said priority information generator, generates a further signal which is supplied to a second input of said second OR gate, said further signal when a logical "1" causing an acknowledge signal to be generated irrespective of the output of said comparator.

11. The interrupt controller claimed in claim 10, further comprising an interrupt flag reset circuit, said central processing unit acknowledging an interrupt request by sending the interrupt processing acknowledge signal to said interrupt flag reset circuit to reset an interrupt flag set by an interrupt request, and said control means includes means for detecting the priority level of the acknowledged interrupt request when an interrupt request is acknowledged, the acknowledged interrupt priority information being supplied to said in-service information generator.

12. The interrupt controller claimed in claim 11, wherein said means for detecting comprises a plurality of acknowledged interrupt priority information decoders, one for each of said interrupt discrimination circuits, said plurality of acknowledged interrupt priority information decoders generating the priority information from said priority designation register means.

13. The interrupt controller claimed in claim 13, wherein said in-service priority information generator comprises said nesting flag and further includes flipflops set by the priority information from said plurality of acknowledged interrupt priority information decoders, said flipflops providing said in-service priority information, and reset logic means responsive to said flipflops and the processing completion signal from said central processing unit for resetting said flipflops in an order of from a highest priority to a lowest priority.

14. The interrupt controller claimed in claim 13, wherein said in-service priority information generator additionally includes a second AND gate controlled by said nesting flag to mask or not mask an output of a highest priority one of said flipflops.

15. The interrupt controller claimed in claim 13, wherein said in-service priority information generator additionally includes a second AND gate controlled by said nesting flag to inhibit or not setting of a highest priority one of said flipflops.

16. The interrupt controller claimed in claim 13, wherein said nesting flag comprises a plurality of nesting permission flags, one for each of a plurality of priority levels, and said in-service priority information generator additionally includes a plurality of second AND gates controlled by a respective one of said nesting permission flags to mask or not mask a corresponding one of said flipflops and logic means responsive to said flipflops and said nesting permission flags for permitting nesting between interrupt request of different priority levels.

17. The interrupt controller claimed in claim 16, wherein said reset logic means further comprises a plurality of up-down counters responsive to said acknowledged interrupt priority information to count up and down count logic responsive to said flipflops and said completion signal from said central processing unit for generating down count signals to said up-down counters, said up-down counters counting numbers of nested interrupts and allowing corresponding flipflops to be reset after all of said nested interrupts for a priority level are executed.

18. The interrupt controller claimed in claim 12, wherein said nesting flag is a nesting permission flag in said nesting controller, said comparator in each of said interrupt discrimination circuits being responsive to said nesting permission flag such that when the nesting permission flag is set to "1", the comparator generates an output logic "1" only when the designated priority in said priority designation register is higher than the in-service priority level from said in-service priority information decoder, but when the nesting permission flag is set to "0", the comparator generates an output logic "1" not only when the designated priority level of the priority designation register means is higher than the in-service priority level from said in-service priority information decoder, but also when the designated priority of the priority designation register is equal to the in-service priority level.

19. The interrupt controller claimed in claim 18, wherein said in-service priority information generator comprises flipflops set by the priority information from said plurality of acknowledged interrupt priority information decoders, said flipflops providing said in-service priority information, and reset logic means responsive to said flipflops and the processing completion signal from said central processing unit for resetting said flipflops in an order of from a highest priority to a lowest priority.

20. The interrupt controller claimed in claim 19, wherein said reset logic means further comprises a plurality of up-down counters responsive to said acknowledged interrupt priority information to count up and down count logic responsive to said flipflops and said completion signal from said central processing unit for generating down count signals to said up-down counters, said up-down counters counting numbers of nested interrupts and allowing corresponding flipflops to be reset after all of said nested interrupts for a priority level are executed.

* * * * *